United States Patent
Naccache et al.

(10) Patent No.: US 11,228,589 B2
(45) Date of Patent: Jan. 18, 2022

(54) SYSTEM AND METHOD FOR EFFICIENT AND SECURE COMMUNICATIONS BETWEEN DEVICES

(71) Applicant: Huawei International Pte. Ltd., Singapore (SG)

(72) Inventors: David Naccache, Paris (FR); Elizabeth Quaglia, Boulogne-Billancourt (FR); Benjamin Smyth, Boulogne-Billancourt (FR)

(73) Assignee: Huawei International Pte. Ltd., Singapore (SG)

(*) Notice: Subject to any disclaimer, the term of this patent is extended or adjusted under 35 U.S.C. 154(b) by 223 days.

(21) Appl. No.: 16/529,470

(22) Filed: Aug. 1, 2019

(65) Prior Publication Data
US 2019/0357039 A1 Nov. 21, 2019

Related U.S. Application Data

(63) Continuation of application No. PCT/SG2018/050046, filed on Jan. 31, 2018.

(30) Foreign Application Priority Data

Feb. 1, 2017 (SG) .......................... 10201700811V (51) Int. Cl.
| | |
|---|---|
| *H04K 1/00* | (2006.01) |
| *H04W 12/00* | (2021.01) |
| *H04L 9/32* | (2006.01) |
| *H04L 9/30* | (2006.01) |
| *H04L 9/06* | (2006.01) |

(Continued)

(52) U.S. Cl.
CPC ........ *H04L 63/0869* (2013.01); *H04L 9/0618* (2013.01); *H04L 9/30* (2013.01); *H04L 9/3247* (2013.01); *H04W 12/03* (2021.01); *H04W 12/033* (2021.01); *H04W 12/041* (2021.01); *H04W 12/0471* (2021.01); *H04W 12/06* (2013.01)

(58) Field of Classification Search
CPC ..... H04L 63/0869; H04L 9/0618; H04L 9/30; H04L 9/3247; H04W 12/0471; H04W 12/03; H04W 12/041; H04W 12/033; H04W 12/06

See application file for complete search history.

(56) References Cited

U.S. PATENT DOCUMENTS

| | | |
|---|---|---|
| 6,003,117 A | 12/1999 | Buer et al. |
| 6,910,094 B1 | 6/2005 | Eslinger et al. |

(Continued)

FOREIGN PATENT DOCUMENTS

| | | |
|---|---|---|
| EP | 2846509 A1 | 3/2015 |
| WO | 2007124658 A1 | 11/2007 |

OTHER PUBLICATIONS

Rescorla et al., "The Transport Layer Security (TLS) Protocol Version 1.3; draft-ietf-tls-tls13-18.txt," Network Working Group, XP015116033, pp. 1-118 (Oct. 26, 2016).

*Primary Examiner* — Darshan I Dhruv
(74) *Attorney, Agent, or Firm* — Leydig, Voit & Mayer, Ltd.

(57) ABSTRACT

This document describes a system and method for a device to communicate efficiently and securely with another device by utilizing two different types of schemes for the generation of data to be transmitted and the handling of received data.

22 Claims, 4 Drawing Sheets

(51) Int. Cl.
*H04L 29/06* (2006.01)
*H04W 12/06* (2021.01)
*H04W 12/03* (2021.01)
*H04W 12/033* (2021.01)
*H04W 12/041* (2021.01)
*H04W 12/0471* (2021.01)

(56) References Cited

U.S. PATENT DOCUMENTS

| | | | |
|---|---|---|---|
| 7,076,653 B1 | 7/2006 | Remer et al. | |
| 7,382,882 B1* | 6/2008 | Immonen | H04W 12/0433 380/270 |
| 9,258,303 B1* | 2/2016 | Galwas | H04L 63/0442 |
| 9,923,923 B1* | 3/2018 | Sharifi Mehr | H04L 9/14 |
| 10,567,434 B1* | 2/2020 | Sharifi Mehr | H04L 63/0435 |
| 2002/0057797 A1* | 5/2002 | Johnson | H04L 9/3249 380/30 |
| 2003/0035547 A1 | 2/2003 | Newton | |
| 2008/0031275 A1* | 2/2008 | Janky | H04W 12/03 370/466 |
| 2009/0217050 A1* | 8/2009 | Amiel | G06F 21/74 713/176 |
| 2010/0278338 A1 | 11/2010 | Chang et al. | |
| 2012/0051542 A1* | 3/2012 | Kim | G01D 4/004 380/255 |
| 2012/0257752 A1* | 10/2012 | Little | H04L 9/30 380/255 |
| 2015/0071139 A1* | 3/2015 | Nix | G06F 21/35 370/311 |
| 2017/0201492 A1* | 7/2017 | Kim | H04L 63/045 |
| 2017/0338951 A1* | 11/2017 | Fu | H04L 9/3236 |
| 2018/0013832 A1* | 1/2018 | Lee | H04L 67/146 |
| 2020/0107220 A1* | 4/2020 | Shreevastav | H03M 7/30 |

* cited by examiner

SYSTEM AND METHOD FOR EFFICIENT AND SECURE COMMUNICATIONS BETWEEN DEVICES

CROSS-REFERENCE TO RELATED APPLICATIONS

This application is a continuation of International Application No. PCT/SG2018/050046, filed on Jan. 31, 2018, which claims priority to Singapore Patent Application No. SG10201700811V, filed on Feb. 1, 2017. The disclosures of the aforementioned applications are hereby incorporated by reference in their entireties.

FIELD OF TECHNOLOGY

Embodiments of the invention relate to a system and method for a device to communicate efficiently and securely with another device by utilizing two different schemes for generating outgoing messages and for handling incoming messages.

BACKGROUND OF THE INVENTION

In today's modern age of digital communications, before any data is transmitted from a source device to a destination device, the data is usually processed using various schemes. For example, in order to prevent data-in-transit from being stolen or misused, data to be transmitted are typically processed before the processed data is transferred over a network or any other transmission mediums. Commonly, but not exclusively, the data may be processed by encrypting the data and/or signing the data. When a target recipient receives the processed data, the recipient may then reverse the process applied to the received data and/or validate the received data using an appropriate process reversal or verification algorithm. The recovered message may then be utilized by the recipient.

An example of processed data is as follows. Typically, data is encrypted before it is transmitted and it is decrypted once it is received. The encryption and decryption processes are usually carried out using a single type of cryptographic scheme. Commonly used encryption-decryption schemes typically involve the use of public key algorithms. Examples of encrypting algorithms that utilize both public and private key components are the RSA cryptographic scheme, and the vDGHV cryptographic scheme. These cryptographic schemes typically require that key exchanges be performed between participating devices so that these devices may carry out the encryption of messages and decryption of ciphertext properly.

If the RSA cryptographic algorithm is adopted to securely exchange messages between users, participating users are not required to preload predetermined parameters. Instead, each user is required to generate their own public and private key pairs. The public keys of participating users are then made known to other users while the private keys are kept secret and not distributed to other users.

Regardless of the process that is applied to incoming or outgoing data, resource-constrained devices such as Internet of Things (IoT) devices find it restrictive to process outgoing and incoming messages or data. For example, IoT devices find it difficult encrypting messages and decrypting ciphertext as each existing cryptographic scheme typically has either a computationally intensive encryption process or a computationally intensive decryption process. In short, there is no single cryptographic scheme that has both an encryption primitive and a decryption primitive that is efficient for a user of the scheme.

For the above reasons, those skilled in the art are constantly striving to come up with a system and method to improve secure communications between resource-constrained devices.

SUMMARY OF THE INVENTION

Systems and methods to improve the efficiency of secure communications between two devices are proposed, and these systems and methods are set out below in accordance with embodiments of the invention.

A first improvement proposed by embodiments of systems and methods in accordance with the invention is that the performance of resource-constrained devices may be greatly improved when such devices are required to communicate securely with other devices.

A second improvement proposed by embodiments of systems and methods in accordance with the invention is that message generating and message handling schemes may be deployed in resource-limited devices without sacrificing the overall performance of these devices.

The above improvements are provided by embodiments of a method in accordance with the invention operating in the following manner.

According to a first aspect of the invention, a method for a first device to communicate efficiently and securely with a second device comprises generating, by the first device, a first message using a first algorithm associated with a first scheme and transmitting the first message to the second device, such that the second device responds by handling the first message by applying a first complementary algorithm associated with the first scheme to the received first message, and based on the handled first message, transmitting a second message generated using a second algorithm associated with a second scheme; receiving the second message from the second device; and handling the received second message by applying a second complementary algorithm associated with the second scheme to the received second message, wherein the first algorithm and the second complementary algorithm fulfils performance criteria for the first device, and whereby the first scheme is different from the second scheme.

With reference to the first aspect, in accordance with embodiments of the invention, before generating the first message using the first algorithm associated with the first scheme, the method comprises: obtaining performance data for a plurality of types of schemes, wherein each scheme comprises an algorithm and a complementary algorithm; identifying from the obtained performance data a scheme having an algorithm that fulfils performance criteria for the first device and setting the identified scheme as the first scheme.

With reference to the first aspect, in accordance with embodiments of the invention, the method further comprises identifying, from the obtained performance data another scheme having a complementary algorithm that fulfils performance criteria for the first device and setting the identified scheme as the second scheme.

With reference to the first aspect, in accordance with embodiments of the invention, before generating the first message using the first algorithm associated with the first scheme, the method comprises: obtaining, by the first device, performance data for a plurality of types of schemes, wherein each scheme comprises an algorithm and a complementary algorithm; identifying from the obtained performance data a scheme having an algorithm that fulfils performance criteria for the first device and a complementary algorithm that fulfils performance criteria for the second device and setting the identified scheme as the first scheme.

With reference to the first aspect, in accordance with embodiments of the invention, the method further comprises: identifying from the obtained performance data another scheme having an algorithm that fulfils performance criteria for the second device and a complementary algorithm that fulfils performance criteria for the first device and setting the identified another scheme as the second scheme.

With reference to the first aspect, in accordance with embodiments of the invention, the first scheme comprises a first encryption scheme, whereby the first algorithm associated with the first scheme comprises an encryption primitive and the first complementary algorithm associated with the first scheme comprises a decryption primitive; and the second scheme comprises a second encryption scheme, whereby the second algorithm associated with the second scheme comprises an encryption primitive, the second complementary algorithm associated with the second scheme comprises a decryption primitive.

With reference to the first aspect, in accordance with embodiments of the invention, the first scheme comprises a first digital signature scheme, whereby the first algorithm associated with the first scheme comprises a signing function and the first processing algorithm associated with the first scheme comprises a verification function; and the second scheme comprises a second digital signature scheme, whereby the second algorithm associated with the second scheme comprises a signing function and the second complementary algorithm associated with the second scheme comprises a verification function.

With reference to the first aspect, in accordance with embodiments of the invention, the first scheme comprises a first encryption scheme, whereby the first algorithm associated with the first scheme comprises an encryption primitive and the first complementary algorithm associated with the first scheme comprises a decryption primitive; and the second scheme comprises a second digital signature scheme, whereby the second algorithm associated with the second scheme comprises a signing function and the second complementary algorithm associated with the second scheme comprises a verification function.

With reference to the first aspect, in accordance with embodiments of the invention, the first scheme comprises a first digital signature scheme, whereby the first algorithm associated with the first scheme comprises a signing function and the first complementary algorithm associated with the first scheme comprises a verification function; and the second scheme comprises a second encryption scheme, whereby the second algorithm associated with the second scheme comprises an encryption primitive, the second complementary algorithm associated with the second scheme comprises a decryption primitive.

With reference to the first aspect, in accordance with embodiments of the invention, the first message may comprise cipher-text and the handled first message may comprise plaintext.

With reference to the first aspect, in accordance with embodiments of the invention, the first message may comprise a signed message and the handled first message may comprise an outcome obtained from a verification function.

With reference to the first aspect, in accordance with embodiments of the invention, the second message may comprise cipher-text and the handled second message may comprise plaintext.

With reference to the first aspect, in accordance with embodiments of the invention, the second message may comprise a signed message and the handled second message may comprise an outcome obtained from a verification function.

With reference to the first aspect, in accordance with embodiments of the invention, the generating the first message and transmitting the first message to the second device comprises: generating the first message using the first algorithm associated with the first scheme; appending an identity of the first scheme to the first message; and transmitting the first message appended with the identify to the second device, such that the second device retrieves the appended identity of the first scheme from the first message, and uses the retrieved identity to select the first complementary algorithm associated with the first scheme to handle the first message.

With reference to the first aspect, in accordance with embodiments of the invention, the handling the received second message comprises: retrieving, by the first device, an identity of the second scheme appended to the second message whereby the identity of the second scheme is appended to the second message by the second device before the second device transmits the second message; and using the retrieved identity to select the second complementary algorithm associated with the second scheme to handle the second message.

According to a second aspect of the invention, a system for a first device to communicate efficiently and securely with a second device comprises: the first device configured to obtain performance data for a plurality of types of schemes, wherein each scheme comprises an algorithm and a complementary algorithm; the first device configured to identify from the obtained performance data a scheme having an algorithm that fulfils performance criteria for the first device and a complementary algorithm that fulfils performance criteria for the second device and setting the identified scheme as the first scheme; the second device configured to obtain performance data for a plurality of types of schemes, wherein each scheme comprises an algorithm and a complementary algorithm; the second device is configured to identify from the obtained performance data another scheme having an algorithm that fulfils performance criteria for the second device and a complementary algorithm that fulfils performance criteria for the first device and setting the identified another scheme as the second scheme; the first device configured to generate a first message using a first algorithm associated with a first scheme and transmit the first message to the second device; the second device configured to respond by handling the first message by applying a first complementary algorithm associated with the first scheme to the received first message, and based on the handled first message, transmit a second message generated using a second algorithm associated with a second scheme; the first device configured to receive the second message from the second device; and handle the received second message by applying a second complementary algorithm associated with the second scheme to the received second message, wherein the first algorithm and the second complementary algorithm fulfils performance criteria for the first device, and whereby the first scheme is different from the second scheme.

With reference to the second aspect, in accordance with embodiments of the invention, the first device is specially configured to determine from the obtained performance data a scheme having an algorithm that fulfils performance criteria for the first device and the complementary algorithm that fulfils performance criteria for the second device; and select a scheme having an algorithm that fulfils performance criteria for the first device and setting the identified scheme as the first scheme, when the scheme having an algorithm that fulfils performance criteria for the first device may only be determined.

With reference to the second aspect, in accordance with embodiments of the invention, the first device is specially configured to determine from the obtained performance data a scheme having an algorithm that fulfils performance criteria for the first device and the complementary algorithm that fulfils performance criteria for the second device; and select a scheme having a complementary algorithm that fulfils performance criteria for the second device and setting the identified scheme as the first scheme, when the scheme having a complementary algorithm that fulfils performance criteria for the second device may only be determined.

With reference to the second aspect, in accordance with embodiments of the invention, the second device is specially configured to determine from the obtained performance data another scheme having an algorithm that fulfils performance criteria for the second device and the complementary algorithm that fulfils performance criteria for the first device; and select another scheme having an algorithm that fulfils performance criteria for the second device and setting the identified another scheme as the second scheme, when the another scheme having an algorithm that fulfils performance criteria for the second device may only be determined.

With reference to the second aspect, in accordance with embodiments of the invention, the second device is configured to determine from the obtained performance data another scheme having an algorithm that fulfils performance criteria for the second device and the complementary algorithm that fulfils performance criteria for the first device; and select another scheme having a complementary algorithm that fulfils performance criteria for the first device and setting the identified another scheme as the first scheme, when the another scheme having a complementary algorithm that fulfils performance criteria for the first device may only be determined.

According to a third aspect of the invention, a first device for communicating efficiently and securely with a second device is disclosed the first device comprising: a processor; and a non-transitory media readable by the processor, the media storing instructions that when executed by the processor, cause the processor to: generate a first message using a first algorithm associated with a first scheme and transmitting the first message to the second device, such that the second device responds by handling the first message by applying a first complementary algorithm associated with the first scheme to the received first message, and based on the handled first message, transmitting a second message generated using a second algorithm associated with a second scheme; receive the second message from the second device; and handle the received second message by applying a second complementary algorithm associated with the second scheme to the received second message, wherein the first algorithm and the second complementary algorithm fulfils performance criteria for the first device, and whereby the first scheme is different from the second scheme.

With reference to the third aspect, in accordance with embodiments of the invention, before instructions to generate the first message using the first algorithm associated with the first scheme, the instructions comprises: instructions for directing the processor to: obtain performance data for a plurality of types of schemes, wherein each scheme comprises an algorithm and a complementary algorithm; and identify from the obtained performance data a scheme having an algorithm that fulfils performance criteria for the first device and setting the identified scheme as the first scheme.

With reference to the third aspect, in accordance with embodiments of the invention, the instructions direct the processor to: identify from the obtained performance data another scheme having a complementary algorithm that fulfils performance criteria for the first device and setting the identified scheme as the second scheme.

With reference to the third aspect, in accordance with embodiments of the invention, before instructions to generate the first message using the first algorithm associated with the first scheme, the instructions comprises: instructions for directing the processor to: obtain performance data for a plurality of types of schemes, wherein each scheme comprises an algorithm and a complementary algorithm; identify from the obtained performance data a scheme having an algorithm that fulfils performance criteria for the first device and a complementary algorithm that fulfils performance criteria for the second device and setting the identified scheme as the first scheme.

With reference to the third aspect, in accordance with embodiments of the invention, before instructions to generate the first message using the first algorithm associated with the first scheme, the instructions comprises: instructions for directing the processor to: identify from the obtained performance data another scheme having an algorithm that fulfils performance criteria for the second device and a complementary algorithm that fulfils performance criteria for the first device and setting the identified another scheme as the second scheme.

With reference to the third aspect, in accordance with embodiments of the invention, the first scheme comprises a first encryption scheme, whereby the first algorithm associated with the first scheme comprises an encryption primitive and the first complementary algorithm associated with the first scheme comprises a decryption primitive; and the second scheme comprises a second encryption scheme, whereby the second algorithm associated with the second scheme comprises an encryption primitive, the second complementary algorithm associated with the second scheme comprises a decryption primitive.

With reference to the third aspect, in accordance with embodiments of the invention, the first scheme comprises a first digital signature scheme, whereby the first algorithm associated with the first scheme comprises a signing function and the first processing algorithm associated with the first scheme comprises a verification function; and the second scheme comprises a second digital signature scheme, whereby the second algorithm associated with the second scheme comprises a signing function and the second complementary algorithm associated with the second scheme comprises a verification function.

With reference to the third aspect, in accordance with embodiments of the invention, the first scheme comprises a first encryption scheme, whereby the first algorithm associated with the first scheme comprises an encryption primitive and the first complementary algorithm associated with the first scheme comprises a decryption primitive; and the second scheme comprises a second digital signature scheme, whereby the second algorithm associated with the second scheme comprises a signing function and the second complementary algorithm associated with the second scheme comprises a verification function.

With reference to the third aspect, in accordance with embodiments of the invention, the first scheme comprises a first digital signature scheme, whereby the first algorithm associated with the first scheme comprises a signing function and the first complementary algorithm associated with the first scheme comprises a verification function; and the second scheme comprises a second encryption scheme, whereby the second algorithm associated with the second scheme comprises an encryption primitive, the second complementary algorithm associated with the second scheme comprises a decryption primitive.

With reference to the third aspect, in accordance with embodiments of the invention, the first message may comprise cipher-text and the handled first message may comprise plaintext.

With reference to the third aspect, in accordance with embodiments of the invention, the first message may comprise a signed message and the handled first message may comprise an outcome obtained from a verification function.

With reference to the third aspect, in accordance with embodiments of the invention, the second message may comprise cipher-text and the handled second message may comprise plaintext.

With reference to the third aspect, in accordance with embodiments of the invention, the second message may comprise a signed message and the handled second message may comprise an outcome obtained from a verification function.

With reference to the third aspect, in accordance with embodiments of the invention, the instructions to generate the first message and transmit the first message to the second device comprises: instructions for directing the processor to: generate the first message using the first algorithm associated with the first scheme; append an identity of the first scheme to the first message; and transmit the first message to the second device, such that the second device retrieves the appended identity of the first scheme from the first message, and uses the retrieved identity to select the first complementary algorithm associated with the first scheme to handle the first message.

With reference to the third aspect, in accordance with embodiments of the invention, the instructions to handle the received second message comprises: instructions for directing the processor to: retrieve an identity of the second scheme appended to the second message whereby the identity of the second scheme is appended to the second message by the second device before the second device transmits the second message; and use the retrieved identity to select the second complementary algorithm associated with the second scheme to handle the second message.

According to a fourth aspect of the invention, a method for a first device to communicate efficiently and securely with a second device is disclosed, the method comprising: receiving from the first device, by the second device, a first message generated using a first algorithm associated with a first scheme; handling the first message by applying a first complementary algorithm associated with the first scheme to the received first message; and based on the handled first message, transmitting a second message generated using a second algorithm associated with a second scheme to the first device, such that the first device responds by handling the received second message by applying a second complementary algorithm associated with the second scheme to the received second message, wherein the first algorithm and the second complementary algorithm fulfils performance criteria for the first device, and whereby the first scheme is different from the second scheme.

With reference to the fourth aspect, in accordance with embodiments of the invention, before the handling the first message by applying the first complementary algorithm associated with the first scheme to the received first message, the method comprises: obtaining, by the second device, performance data for a plurality of types of schemes, wherein each scheme comprises an algorithm and a complementary algorithm; and identifying from the obtained performance data a scheme having an algorithm that fulfils performance criteria for the first device and setting the identified scheme as the first scheme.

With reference to the fourth aspect, in accordance with embodiments of the invention, identifying, by the second device, from the obtained performance data another scheme having a complementary algorithm that fulfils performance criteria for the first device and setting the identified scheme as the second scheme.

With reference to the fourth aspect, in accordance with embodiments of the invention, before generating the first message using the first algorithm associated with the first scheme, the method comprises: obtaining, by the second device, performance data for a plurality of types of schemes, wherein each scheme comprises an algorithm and a complementary algorithm; identifying from the obtained performance data a scheme having an algorithm that fulfils performance criteria for the first device and a complementary algorithm that fulfils performance criteria for the second device and setting the identified scheme as the first scheme.

With reference to the fourth aspect, in accordance with embodiments of the invention, identifying from the obtained performance data another scheme having an algorithm that fulfils performance criteria for the second device and a complementary algorithm that fulfils performance criteria for the first device and setting the identified another scheme as the second scheme.

With reference to the fourth aspect, in accordance with embodiments of the invention, the first scheme comprises a first encryption scheme, whereby the first algorithm associated with the first scheme comprises an encryption primitive and the first complementary algorithm associated with the first scheme comprises a decryption primitive; and the second scheme comprises a second encryption scheme, whereby the second algorithm associated with the second scheme comprises an encryption primitive, the second complementary algorithm associated with the second scheme comprises a decryption primitive.

With reference to the fourth aspect, in accordance with embodiments of the invention, the first scheme comprises a first digital signature scheme, whereby the first algorithm associated with the first scheme comprises a signing function and the first processing algorithm associated with the first scheme comprises a verification function; and the second scheme comprises a second digital signature scheme, whereby the second algorithm associated with the second scheme comprises a signing function and the second complementary algorithm associated with the second scheme comprises a verification function.

With reference to the fourth aspect, in accordance with embodiments of the invention, the first scheme comprises a first encryption scheme, whereby the first algorithm associated with the first scheme comprises an encryption primitive and the first complementary algorithm associated with the first scheme comprises a decryption primitive; and the second scheme comprises a second digital signature scheme, whereby the second algorithm associated with the second scheme comprises a signing function and the second complementary algorithm associated with the second scheme comprises a verification function.

With reference to the fourth aspect, in accordance with embodiments of the invention, the first scheme comprises a first digital signature scheme, whereby the first algorithm associated with the first scheme comprises a signing function and the first complementary algorithm associated with the first scheme comprises a verification function; and the second scheme comprises a second encryption scheme, whereby the second algorithm associated with the second scheme comprises an encryption primitive, the second complementary algorithm associated with the second scheme comprises a decryption primitive.

According to a fifth aspect of the invention, a second device for communicating efficiently and securely with a first device is disclosed the second device comprising: a processor; and a non-transitory media readable by the processor, the media storing instructions that when executed by the processor, cause the processor to: receive from the first device a first message generated by using a first algorithm associated with a first scheme; handle the first message by applying a first complementary algorithm associated with the first scheme to the received first message; and based on the handled first message, transmit a second message generated using a second algorithm associated with a second scheme to the first device, such that the first device responds by handling the received second message by applying a second complementary algorithm associated with the second scheme to the received second message, wherein the first algorithm and the second complementary algorithm fulfils performance criteria for the first device, and whereby the first scheme is different from the second scheme.

With reference to the fifth aspect, in accordance with embodiments of the invention, before the instructions to handle the first message by applying the first complementary algorithm associated with the first scheme to the received first message, the instructions further comprises: instructions for directing the processor to: obtain performance data for a plurality of types of schemes, wherein each scheme comprises an algorithm and a complementary algorithm; and identify from the obtained performance data a scheme having an algorithm that fulfils performance criteria for the first device and setting the identified scheme as the first scheme.

With reference to the fifth aspect, in accordance with embodiments of the invention, instructions for directing the processor to: identify from the obtained performance data another scheme having a complementary algorithm that fulfils performance criteria for the first device and setting the identified scheme as the second scheme.

With reference to the fifth aspect, in accordance with embodiments of the invention, before the instructions to generate the first message using the first algorithm associated with the first scheme, the instructions further comprise: instructions for directing the processor to: obtain performance data for a plurality of types of schemes, wherein each scheme comprises an algorithm and a complementary algorithm; and identify from the obtained performance data a scheme having an algorithm that fulfils performance criteria for the first device and a complementary algorithm that fulfils performance criteria for the second device and setting the identified scheme as the first scheme.

With reference to the fifth aspect, in accordance with embodiments of the invention, the instructions further comprise: instructions for directing the processor to: identify from the obtained performance data another scheme having an algorithm that fulfils performance criteria for the second device and a complementary algorithm that fulfils performance criteria for the first device and setting the identified another scheme as the second scheme.

BRIEF DESCRIPTION OF THE DRAWINGS

The above advantages and features in accordance with this invention are described in the following detailed description and are shown in the following drawings.

DETAILED DESCRIPTION OF THE EMBODIMENT

This invention relates to a system and method for a source device to communicate efficiently and securely with a destination device, whereby the source device utilizes a message generating algorithm associated with one scheme for generating outgoing message to be transmitted and a message handling algorithm associated with another scheme to handle incoming messages. One skilled in the art will recognize that the term messages may be used interchangeably with data without departing from this invention.

In particular, when the source device generates a message to be transmitted, the source device will select a first scheme having an algorithm that fulfils certain performance criteria for the source device. This first scheme is then utilized to carry out the generating of the message. The message is then transmitted to the destination device. At the destination device, the device will handle the received message by applying a complementary algorithm associated with the first scheme to the received message.

Based on the outcome of the handled received message, the destination device then generates a message to be sent to the source device, whereby the message will be generated using an algorithm belonging to a second scheme. The second scheme is selected to carry out the generation of the message to be sent to the source device because the second scheme has a complementary algorithm that fulfils certain performance criteria for the source device. The generated message is then sent from the destination device to the source device. The source device then handles the received message by applying the complementary algorithm associated with the second scheme to the received message.

In another embodiment of the invention, when the source device generates a message to be transmitted, the source device will select a first scheme having an algorithm that fulfils certain performance criteria for the source device and a complementary algorithm that fulfils certain performance criteria for the destination device. This first scheme is then utilized to carry out the generation of the message. The message is then transmitted to the destination device. At the destination device, the device will handle the received message by applying the complementary algorithm associated with the first scheme to the received message.

Based on the outcome of the handled message, the destination device then selects a second scheme having an algorithm that fulfils certain performance criteria for the destination device and a complementary algorithm that fulfils certain performance criteria for the source device. The destination device then generates a message to be sent to the source device using the algorithm associated with the second scheme. The generated message is then sent from the destination device to the source device. The source device then handles the received message by applying the complementary algorithm associated with the second scheme to the received message.

In embodiments of the invention, the first and/or second algorithms may comprise encryption primitives or signing functions configured to carry out the encryption or signing of plaintext. The purpose of these algorithms is to generate a message that is to be transmitted to another device. The generated message will then be sent to the respective devices. In embodiments of the invention, the first and/or second complementary algorithms may comprise decryption primitives or verification functions configured to carry out the decryption or validation of a received message. Although this embodiment only described encryption and signing schemes, one skilled in the art will recognize that other types of schemes such as, but not limited to, schemes for demonstrating the authenticity of a message, schemes for performing security-related functions, etc., may be utilized without departing from the invention.

One skilled in the art will recognize that many functional units in this description have been labelled as modules throughout the specification. The person skilled in the art will also recognize that a module may be implemented as electronic circuits, logic chips or any combination of electrical and/or electronic discrete components within a device. Further, one skilled in the art will also recognize that a module may be implemented in software which may then be executed by a variety of processors. In embodiments of the invention, a module may also comprise computer instructions or executable code that may instruct a computer processor to carry out a sequence of events based on instructions received. The choice of the implementation of the modules is left as a design choice to a person skilled in the art and does not limit the scope of this invention in any way.

Further, a person skilled in the art will also recognize that any references to the generation of a message may relate to any type of scheme or algorithm that may modify the structure of the message and this includes processes such as, but not limited to, the encryption of the message, the signing of the message, or the proving of some property of the message. Similarly, any references to the handling of a message may involve a procedure that may either reverse a process applied to a message or a procedure to verify the authenticity of a message and includes schemes such as, but not limited to, the decryption of an encrypted message or the verification of a signed/proved message. Still further, a person skilled in the art will recognize that references to the encryption/signing or decryption primitives/verification functions may refer to cryptographic algorithms that may be used to execute certain cryptographic protocols and these primitives may include, but are not limited to, one-way hash functions and/or encryption/decryption functions.

Figure 1:
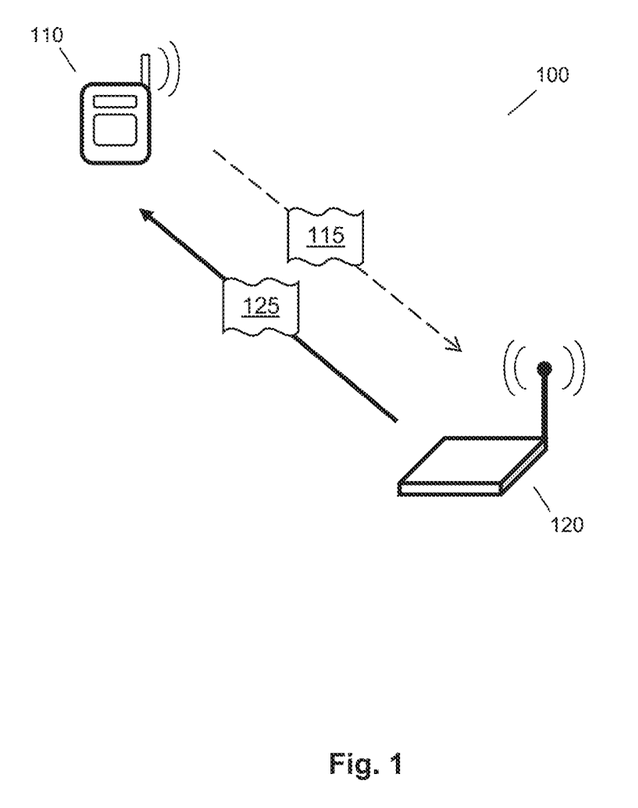
FIG. 1 illustrating an exemplary block diagram of a network to support secure and efficient communications between two devices in accordance with embodiments of the invention.

FIG. 1 illustrates an exemplary block diagram of a network to support secure and efficient communications between two devices in accordance with embodiments of the invention. Network 100 includes a source device 110 and a destination device 120. Source device and destination device 120 each may comprise, but is not limited to, any device that is able to carry out communicative functions either wirelessly or through wired connections such as smart phones, computers, tablet computers, mobile computers, netbooks or wearable electronic devices such as smart watches, smart plugs, or any type of communication devices that may be configured to transmit and receive data or messages wirelessly. Each of these devices is also provided with a variety of modules for carrying out the various communication and processing functions.

One skilled in the art will recognize that source device 110 and destination device 120 may also comprise Internet of Things (IoT) enabled devices. It should be noted that IoT devices typically comprise devices which are configured to perform only simple computational functions due to the IoT device's limited resources. Some examples of IoT devices include printers, display devices, home appliances, lighting appliances, etc.

Source device 110 and destination device 120 may both be configured to wirelessly communicate with each other through the Internet or wireless networks such as, but are not limited to, cellular networks, satellite networks, telecommunication networks, or Wide Area Networks (WAN). Communications between these two devices may also take place via wired means. In addition to the above, source device 110 is also configured to communicate directly with destination device 120 when these two devices are brought into close physical proximity with each other. When these devices are in sufficiently close physical proximity, wireless communications between these two devices may take place through wireless communication means such as, but not limited to, Wireless-Fidelity (Wi-Fi®), Bluetooth, or Near Field Communication (NFC) protocols.

When message 115 is to be sent from source device 110 to destination device 120, message 115 will first have to be generated at source device 110. Similarly, when message 125 is to be sent from destination device 120 to source device 110, message 125 will also have to be generated at destination device 120.

In embodiments of the invention, this step of generating a message may involve, but is not limited to, the encryption of the message and this may take place using public key encryption schemes. In typical public key encryption schemes, a message "m" will be encrypted using an encryption algorithm E, whereby a ciphertext, c, is generated using the following equation c=E(PK, m), where PK is a public key.

When an intended recipient of the ciphertext c, receives the ciphertext c, the recipient may handle the received message by decrypting the encrypted message c by applying a decryption function D such that m=D(SK, c) where SK is a private key linked to the public key PK. It should be noted that the public and private keys (respectively PK and SK) may be generated by means of a probabilistic algorithm called a key-generating algorithm.

There are many public key encryption algorithms known to those skilled in the art. They include, but are not limited to, the RSA cryptographic algorithm, the vDGHV cryptographic algorithm, El Gamal, Goppa, McEliece, McE, Naccache-Sternres, NS Knapsack, NTRU, Paillier, Rabin, RSA and Shamir. The following examples illustrate two encryption schemes that may be utilized to carry out the invention as described below however; one skilled in the art will recognize that other schemes may be used and that these two examples are chosen to assist in the understanding of the invention. In particular, in this example, a scheme used by source device 110 to generate a message may comprise the RSA cryptographic scheme while a scheme used by destination device 120 to generate a message may comprise a vDGHV cryptographic scheme. In order to better understand this example, we set out below a brief description of the workings of the two schemes.

When a version of the RSA cryptographic scheme is adopted by devices 110 and 120, one of the devices is required to determine a public and private key pair. For example, device 120 may be configured to determine a public and private key pair as follows. First, device 120 will randomly generate two large prime numbers, p and q, which are then kept secret. Device 120 may then utilize the two randomly generated large prime numbers p and q to generate a public key n according to the following formula: $n=q*p$. The public key is then made known to device 110.

The two randomly generated large prime numbers p and q are then combined with a public component e, which comprises a very large positive value. This combination may then be used to generate a private key d for device 120. It should be noted that private key d is not made known to other users such as device 110 and is used later on to decrypt cipher-text. The formula used to generate private key d is as follows: $d=e-1 \mod[(p-1)(q-1)]$.

When a message m is encrypted by device 110 to produce an encrypted message c, device 110 would then use device 120's public key to encrypt the message m using the following formula: $c=me \mod n$.

In order to decrypt encrypted message c, device 120 would then use its private key and the following formula: $m=cd \mod n$.

It should be noted from the equations above that when this version of the RSA cryptographic scheme is adopted, lesser computations need to be carried out by device 110 to generate ciphertext c, as compared to the recovery of message m from ciphertext c, by device 120. Hence for this version of the RSA cryptographic scheme, it can be said that it is typically less computationally intensive for the RSA algorithm to encrypt a message, e.g. to generate a message, than to decrypt a message, e.g. to handle a received message.

When a version of the vDGHV cryptographic scheme is adopted by both devices 110 or 120, device 110 is required to determine a public and private key pair. For example, device 110 may be configured to determine a public and private key pair as follows. A private key SK is obtained by generating a large odd number p while the public key PK is obtained from a collection of integers $x[i]=q[i] \times p+r[i]$ for values of i ranging from i to k, and q[i] and r[i] which are random numbers. It should be noted that element x[0] of the vDGHV public key PK has a particular feature that for the element x[0], r[0]=0. The public key is then made known to device 120.

When device 120 intends to encrypt a message m, to produce ciphertext c, device 120 will use the following equation: $c=m+2r+2Z$ where r is a random number with a size somewhat similar to that of the r[i] values; and $Z=x[1] \cdot e[1]+ \ldots +x[k] \cdot e[k]$ where the e[i] are the random bits (i.e. e[i]=0 or 1 randomly).

When device 110 intends to decrypt an encrypted message c, device 110 computes the message from the ciphertext as $m=(c \mod p) \mod 2$.

It should be noted from the equations above that when this version of the vDGHV cryptographic scheme is adopted, lesser computations need to be carried out by device 110 to decipher message m from ciphertext c as compared to the encryption of message m to produce ciphertext c by device 120. Hence for this version of the vDGHZ cryptographic scheme, it can be said that for this scheme, it is less computationally intensive for this scheme to decrypt a message, e.g. to handle a received message, than to encrypt a message, e.g. to generate a message. One skilled in the art will recognize that various other schemes may be adopted to generate a message and/or handle a received message without departing from this invention.

Figure 2:
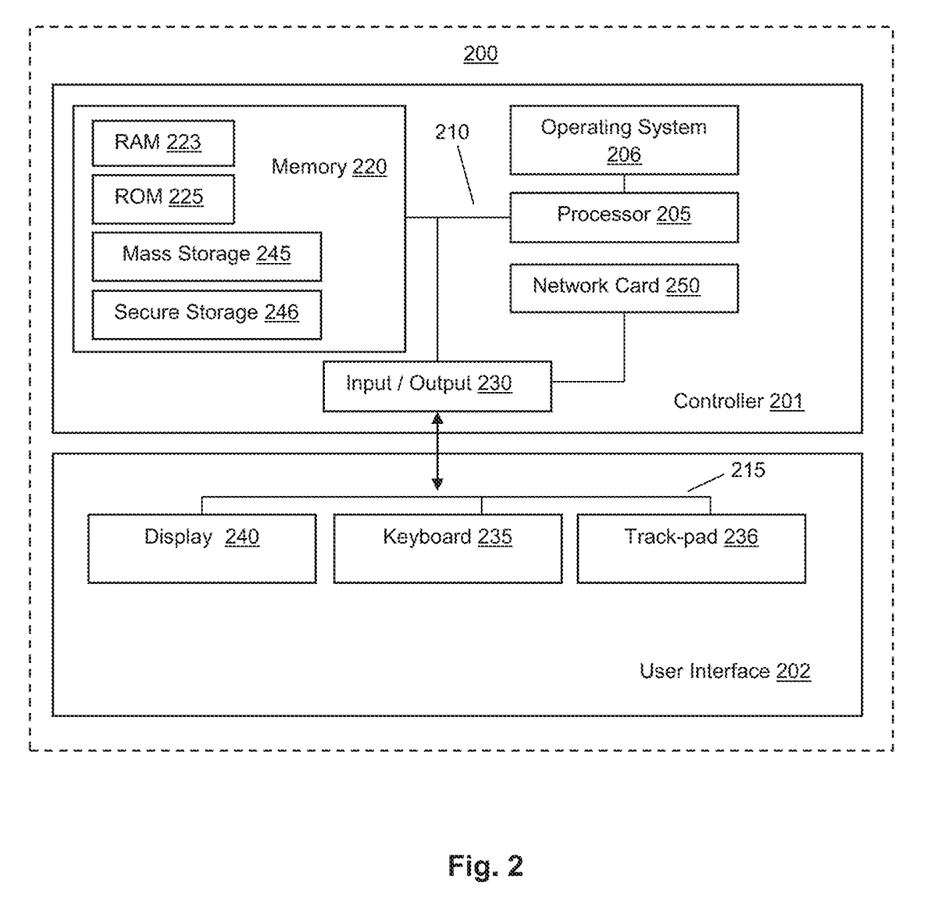
FIG. 2 illustrating a block diagram representative of components in an electronic device for implementing embodiments in accordance with embodiments of the invention.

FIG. 2 illustrates a block diagram representative of components of module 200 that may be provided within devices 110 and 120 for implementing embodiments in accordance with embodiments of the invention. One skilled in the art will recognize that the exact configuration of each wireless device provided within the devices or the access point may be different and the exact configuration of module 200 may vary and FIG. 2 is provided by way of example only.

In embodiments of the invention, module 200 comprises controller 201 and user interface 202. User interface 202 is arranged to enable manual interactions between a user and module 200 and for this purpose includes the input/output components required for the user to enter instructions to control module 200. A person skilled in the art will recognize that components of user interface 202 may vary from embodiment to embodiment but will typically include one or more of display 240, keyboard 235 and track-pad 236.

Controller 201 is in data communication with user interface 202 via bus 215 and includes memory 220, processor 205 mounted on a circuit board that processes instructions and data for performing the method of this embodiment, an operating system 206, an input/output (I/O) interface 230 for communicating with user interface 202 and a communications interface, in this embodiment in the form of a network card 250. Network card 250 may, for example, be utilized to send data from electronic device 200 via a wired or wireless network to other processing devices or to receive data via the wired or wireless network. Wireless networks that may be utilized by network card 250 include, but are not limited to, Wireless-Fidelity (Wi-Fi®), Bluetooth, Near Field Communication (NFC), cellular networks, satellite networks, telecommunication networks, Wide Area Networks (WAN), etc.

Memory 220 and operating system 206 are in data communication with CPU 205 via bus 210. The memory components include both volatile and non-volatile memory and more than one of each type of memory, including Random Access Memory (RAM) 220, Read Only Memory (ROM) 225 and a mass storage device 245, the last comprising one or more solid-state drives (SSDs) or any other types of drives. Memory 220 also includes secure storage 246 for securely storing secret keys, or private keys. It should be noted that the contents within secure storage 246 might only be accessible by a super-user or administrator of module 200 and might not be accessed by any user of module 200. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 220 may include a kernel and/or programming modules such as a software application that may be stored in either volatile or non-volatile memory.

Herein the term "processor" is used to refer generically to any device or component that can process such instructions and may include: a microprocessor, microcontroller, programmable logic device or other computational device. That is, processor 205 may be provided by any suitable logic circuitry for receiving inputs, processing them in accordance with instructions stored in memory and generating outputs (for example to the memory components or on display 240). In this embodiment, processor 205 may be a single core or multi-core processor with memory addressable space. In one example, processor 205 may be multi-core, comprising—for example—an 8 core CPU.

Figure 3:
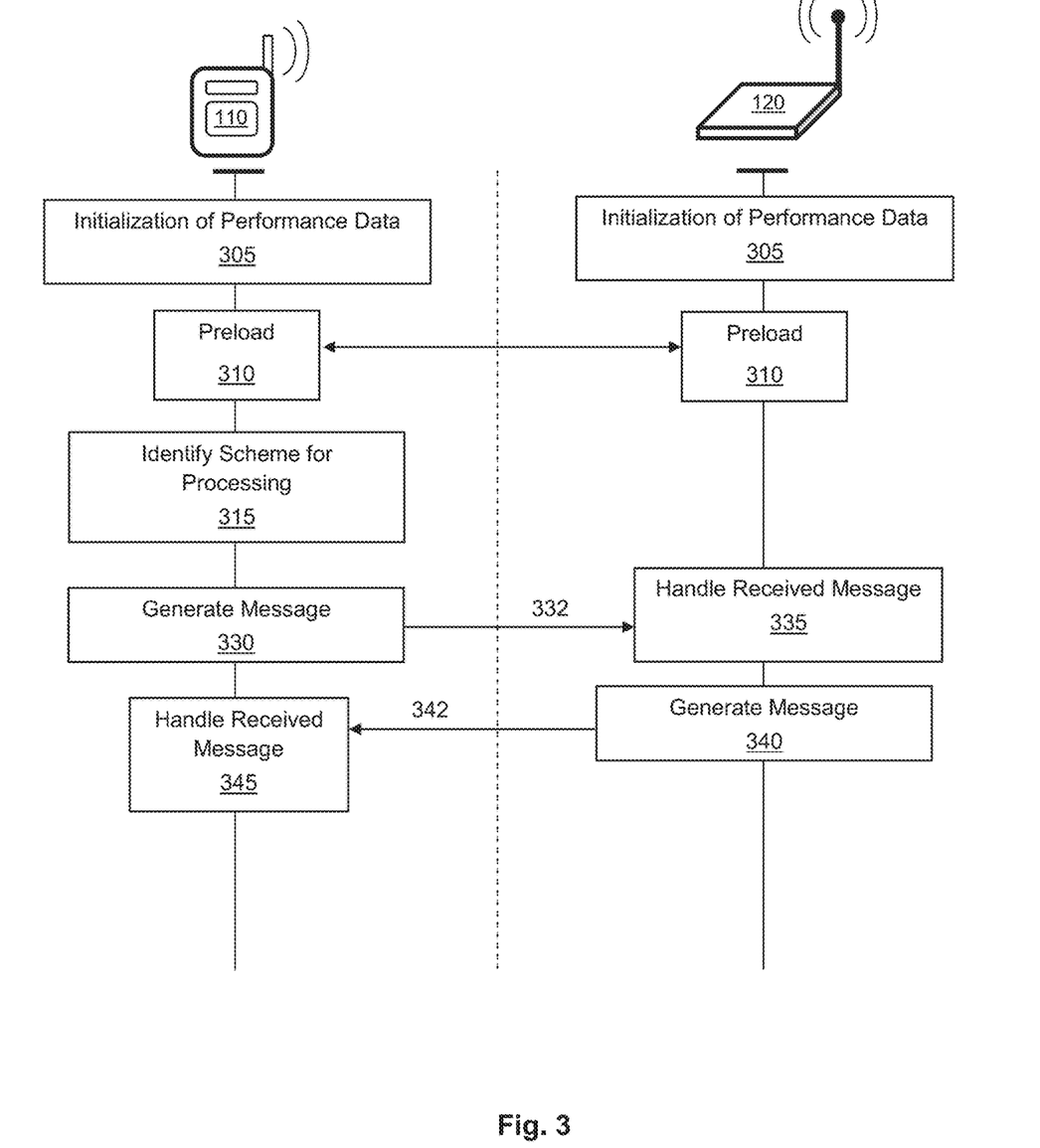
FIG. 3 illustrating a timing diagram for the efficient and secure communications in accordance with embodiments of the invention.

FIG. 3 illustrates a timing diagram for efficient and secure communication between source device 110 and destination device 120 in accordance with embodiments of the invention. During a setup phase, at step 305, source device 110 and destination device 120 will first obtain performance data for a variety of schemes installed within these two devices. In particular, performance data is obtained and recorded for the generating step and for the complementary handling step for each of the variety of schemes. This may be done for both devices as follows.

In an embodiment of the invention, device 110 will first select a scheme that is to be evaluated. This device then proceeds to compute all the prerequisite parameters that are required for the selected scheme. For example, if the cryptographic scheme relates to an encryption scheme, then the parameters for the encryption and decryption processes are computed. If the scheme relates to a signing scheme, parameters relevant to the signing and verification function will then be computed.

Then, device 110 will proceed to generate a message to be transmitted using the algorithm associated with the selected scheme. The amount of resources required to carry out the generation of the message is then noted down together with the amount of time that was taken to complete the process. The resources that are noted down include, but are not limited to, bandwidth, energy and storage required.

Device 110 will then proceed to handle the generated message by applying a complementary algorithm associated with the selected scheme to the generated message. One skilled in the art will recognize that the complementary algorithm refers to any algorithm that supplements the earlier applied processing algorithm. For example, if the algorithm comprises an encryption algorithm, the complementary algorithm will comprise a decryption algorithm. Further, if the algorithm comprises a signing function, the complementary algorithm will comprise a verification function.

After the complementary algorithm associated with the selected scheme has been applied to the message, the amount of resources required to carry out the complementary procedure is then noted down together with the amount of time that was taken to complete the process.

This process is then repeated for all the schemes stored within device 110 thereby populating a database provided within device 110 with performance data of the various schemes. Once this is done, device 110 will then have the individual performance data of device 110 for the various schemes and their associated algorithms for generating a message and complementary algorithms for handling generated messages.

Similarly, step 305 is carried out at device 120 until all the schemes stored within device 120 have been successfully evaluated and a database provided within device 120 has been populated with performance data of the various schemes. This means that device 120 will now have the individual performance data of device 120 for the various schemes and their associated algorithms for generating a message and complementary algorithms for handling generated messages. Upon completion of step 305, this means that device 120 is then able to select a scheme based on the performance data of an associated processing and/or complementary processing algorithm.

In embodiments of the invention, when the schemes relate to cryptographic type schemes, source device 110 and destination device 120 may contain a RSA cryptographic scheme, a vDGHV cryptographic scheme, a NTRU cryptographic scheme, an NSKnapsack cryptographic scheme and a McEliece cryptographic scheme. The detailed workings of these cryptographic schemes are omitted for brevity as they are known to those skilled in the art.

All the public parameters and public keys for the various schemes contained within devices 110 and 120 are then shared between these two devices at step 310. In addition to sharing all these parameters, the database containing the performance data of the various schemes are also shared at this step. In other words, the database generated by device 110 will be shared with device 120 and similarly, the database generated by device 120 will be shared with device 110. Upon completion of this sharing step, this means that devices 110 and 120 are now able to negotiate schemes that are to be adopted by both devices or by either device based on the performance data of associated processing and/or complementary processing algorithms.

In other embodiments of the invention, the performance data for the various types of schemes in relation to devices 110 and/or 120 may be provided by an external third party such as a cloud server, a website, or other remote sources. This means that the evaluation of the performance of the various schemes takes place at the external third party thereby negating the need for devices 110 and 120 to carry out the energy consuming calculation processes. In other words, at step 305, the generation of the performance data by devices 110 and 120 is replaced by the step of devices 110 and 120 receiving the performance data from the external third parties. Upon receiving the performance data from the external third party sources, devices 110 and 120 just has to store the received individual performance data of devices 110 and 120 for the various schemes together with their associated algorithms for generating a message and complementary algorithms for handling generated messages and the data may be stored as a look-up table for further use.

Source device 110 then proceeds to step 315. At this step, source device 110 will select from the performance data contained in its database a scheme having an algorithm that fulfils certain or all performance criteria for source device 110 when generating a message. The performance criteria may comprise, but is not limited to, an upper-bound on computational requirements such as bandwidth, energy, storage and/or time. In this embodiment of the invention, it should be noted that at this step, the selection of the scheme is based purely on the performance data of the scheme's algorithm for generating a message for the source device and that the performance of the complementary algorithm associated with the selected scheme for handling a received message is not taken into consideration.

In another embodiment of the invention, source device 110 will identify from the performance data a first scheme having an algorithm for generating a message that fulfils performance criteria for source device 110 and a complementary algorithm for handling a received message that fulfils performance criteria for destination device 120. Source device 110 will then proceed to identify from the performance data a second scheme having an algorithm for generating a message that fulfils performance criteria for destination device 120 and a complementary algorithm for handling a received message that fulfils performance criteria for source device 110. Similarly, the performance criteria may comprise, but is not limited to, an upper-bound on computational requirements such as bandwidth, energy, storage and/or time. For this embodiment of the invention, it should be noted that the selection of the first and second schemes are based on the performance data of both source and destination devices. Source device 110 will then instruct destination device 120 to utilize the selected second scheme for the processing of messages that are to be sent to source device 110. This instruction may be embedded or appended to the message by source device 110 such that that the instruction will be transmitted together with the message. Alternatively, source device 110 may transmit the instructions separately, prior to the transmission of the processed message.

Once an appropriate scheme has been selected, source device 110 then proceeds to generate the message using the algorithm associated with the selected scheme at step 330.

The generated message is then transmitted to destination device 120 at step 332. At step 335, device 120 will then utilize preloaded parameters (obtained at step 310) to select an appropriate scheme that is to be applied to the received message. Once the scheme is determined, the message is handled by applying a complementary algorithm associated with the determined scheme to the received message.

In yet another embodiment of the invention, at step 330, in addition to generating the message using the selected scheme at this step, source device 110 may also add the identity of the selected scheme into a data identifier. The main purpose of the data identifier is to assist devices 110 and 120 in determining the scheme that was used to generate a received message thereby allowing source device 110 to inform destination device 120 of the use of new types of message generation schemes. The data identifier (containing the identity of the selected scheme) is then appended to the generated message. The generated message together with the appended data identifier is then transmitted at step 332 to destination device 120. Alternatively, in another embodiment of the invention, the identity of the scheme may be directly appended to the generated message and the final message may then be transmitted to destination device 120.

Upon receiving the transmitted data, based on the content in the data identifier, device 120 will then retrieve the identity of the scheme that was used to process the message. Once this is done, device 120 may retrieve the appropriate parameters, e.g. the scheme and the complementary algorithm associated with the scheme, to handle the retrieved message. Alternatively, in another embodiment of the invention, the identity of the relevant scheme may be directly retrieved from the received message and device 120 may retrieve the appropriate parameters to handle the retrieved message.

As destination device 120 has now successfully handled the received message by applying the complementary algorithm of an appropriate scheme to the received message as transmitted from source device 110 and utilized its contents, destination device 120 now proceeds to generate its own message for source device 110.

In an embodiment of the invention, at step 340, destination device 120 will first select from the performance data contained in its database a scheme having a complementary algorithm that fulfils certain or all performance criteria for source device 110.

It should be noted that in this embodiment, the selection of the scheme by destination device 120 is based purely on the performance data of the scheme's complementary algorithm for source device 110 and that the performance of the selected scheme for destination device 120 is not taken into consideration even though destination device 120 will be employing an associated algorithm to generate the message.

In another embodiment of the invention, at step 340, destination device 120 may select a second scheme that will have an algorithm that fulfils performance criteria for destination device 120 during the generation of a message and a complementary algorithm that fulfils performance criteria for source device 110 during the handling of the received message at device 110.

Once an appropriate scheme has been selected, device 120 then proceeds to generate the message using the algorithm associated with the selected scheme at step 340.

The generated message is then transmitted to source device 110 at step 342. At step 345, source device 110 will then utilize preloaded parameters and a corresponding scheme to handle the received message. Once the scheme is determined, an associated complementary algorithm may then be retrieved.

In yet another embodiment of the invention, at step 335, in addition to generating the message using the selected scheme at this step, destination device 120 may also add the identity of the selected scheme into a data identifier. The data identifier (containing the identity of the selected scheme) is then appended to the generated message. The message together with the appended data identifier is then transmitted at step 342 to source device 110. Alternatively, in another embodiment of the invention, the identity of the scheme may be directly appended to the generated message and the final message may then be transmitted to destination device 110.

Upon receiving the transmitted data, source device 110 will then retrieve the identity of the scheme that was used to generate the message from the appended data identifier. Once this is done, device 110 then may retrieve the appropriate parameters and scheme to handle the received message. Alternatively, in another embodiment of the invention, the identity of the relevant scheme may be directly retrieved from the received message (assuming that the identity was appended to the message) and device 110 may retrieve the appropriate parameters to handle the retrieved message.

In embodiments of the invention, the message generated at source device 110 may comprise cipher-text and when this message is received and handled by destination device 110, the handled message may comprise plaintext. In other embodiments of the invention, the message generated at source device 110 may comprise a signed message and when this message is received and handled by destination device 110, the handled message may comprise an outcome produced by a verification function.

In accordance with embodiments of the invention, a method for a first device to communicate efficiently and securely with a second device comprises the first device carrying out the following three steps:

Step 1, generating a first message using a first algorithm associated with a first scheme and transmitting the first message to the second device, such that the second device responds by handling the first message by applying a first complementary algorithm associated with the first scheme to the received first message, and based on the handled first message, transmitting a second message generated using a second algorithm associated with a second scheme;

Step 2, receiving the second message from the second device; and

Step 3, handling the received second message by applying a second complementary algorithm associated with the second scheme to the received second message, wherein the first algorithm and the second complementary algorithm fulfils performance criteria for the first device, and whereby the first scheme is different from the second scheme.

In order to provide such a system or method, a process is needed for configuring a first device to communicate efficiently and securely with a second device. The following description and FIG. 4 describes embodiments of processes that provide the necessary steps in accordance with this invention.

Figure 4:
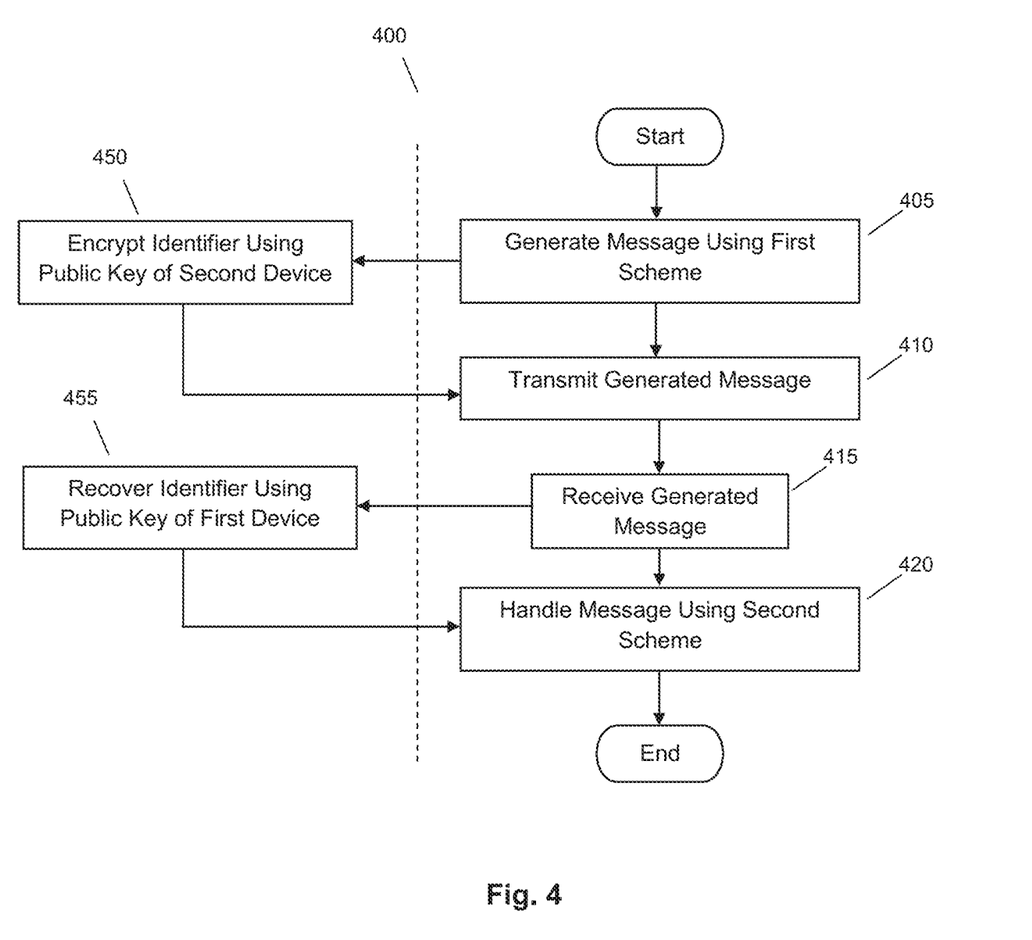
FIG. 4 illustrating a flow diagram showing a process in a first device for processing data and reversing the process applied to received data in an efficient manner in accordance with embodiments of the invention.

FIG. 4 illustrates process 400 that is performed by a first device to communicate efficiently and securely with a second device. Process 400 begins at step 405 by generating a message to be transmitted to the second device using a first scheme. Process 400 is configured to select a scheme that utilizes a generating algorithm that fulfils certain or all performance criteria for the first device as the first scheme to carry out the generating procedure. Process 400 then transmits the generated message to the second device at step 410.

At the second device, the second device will handle the received message by applying a first complementary algorithm associated with the scheme adopted by the first device to the received message. Based on the result obtained, the second device then selects a second scheme having a complementary algorithm that fulfils certain or all performance criteria for the first device. The second device then utilizes the algorithm associated with the selected second scheme to generate a message. After the second device has processed its message, the second device will then transmit the generated message to the first device. Process 400 will then receive the message from the second device at step 415.

Process 400 will then handle the received message by applying the complementary algorithm associated with the second scheme to the received message at step 420. It should be noted that the first scheme is different from the second scheme. Process 400 then ends.

In another embodiment of the invention, the schemes may involve cryptographic schemes and as such, the first scheme may comprise a RSA cryptographic scheme and the second scheme may comprise a vDGHV cryptographic scheme. In another variation in this embodiment of the invention, the first scheme may comprise a RSA cryptographic scheme and the second scheme may comprise a NTRU cryptographic scheme. In yet another variation in this embodiment of the invention, the first scheme may comprise a NSKnapsack cryptographic scheme and the second scheme may comprise a McEliece cryptographic scheme.

With reference to FIG. 4, in yet another embodiment of the invention, after process 400 has utilized a generating algorithm (that fulfils certain or all performance criteria for the first device) to carry out the generating of the message, process 400 may then proceed to step 450 instead of directly to step 410.

At step 450, process 400 will then add the identity of the scheme associated with the algorithm used to carry out the generation of the message to a data identifier. The identifier (containing the identity of the selected scheme) is then appended to the generated message by process 400.

Process 400 then transmits the message together with the appended encrypted data identifier to the second device at step 410.

After the second device has handled its received message using a second scheme having a complementary algorithm that fulfils certain or all performance criteria for the first device, the second device will then add the identity of the selected scheme used to generate the message at the second device into a data identifier. The identifier (containing the identity of the selected scheme) is then appended to the generated message and the second device will then transmit the message to the first device.

Process 400 will then receive the message from the second device at step 415. Process 400 then proceeds to step 455 where the first device will first decrypt the identifier using its own master key. Process 400 will then retrieve the identity of the second scheme that was used to generate the message from the decrypted identifier. Once this is done, process 400 then may retrieve the appropriate parameters of the second scheme and its associated complementary algorithm.

Process 400 will then handle the received message using the complementary algorithm associated with the second scheme at step 420, wherein the second scheme applies a complementary algorithm optimized for the first device to the received message. It should be noted that the first scheme is different from the second scheme. Process 400 then ends.

The above is a description of embodiments of a system and process in accordance with the present invention as set forth in the following claims. It is envisioned that others may and will design alternatives that fall within the scope of the following claims.

What is claimed is:
1. A method for a first device to communicate efficiently and securely with a second device, comprising:
generating, by the first device, a first message using a first algorithm associated with a first scheme;
transmitting, by the first device, the first message to the second device, such that the second device applies a first complementary algorithm associated with the first scheme to the received first message;
receiving, at the first device, a second message from the second device, wherein the second message is generated by the second device applying a second algorithm associated with a second scheme; and
applying, by the first device, to the second message a second complementary algorithm associated with the second scheme,
wherein the first algorithm and the second complementary algorithm fulfil performance criteria for the first device, and whereby the first scheme is different from the second scheme, and
wherein before generating the first message using the first algorithm associated with the first scheme, the method comprises:
obtaining, by the first device, performance data for a plurality of types of schemes, wherein each scheme comprises an algorithm and a complementary algorithm; and
identifying, by the first device, from the obtained performance data a scheme having an algorithm that fulfils performance criteria for the first device and setting the identified scheme as the first scheme,
wherein before generating the first message using the first algorithm associated with the first scheme, the method comprises:
obtaining, by the first device, performance data for a plurality of types of schemes, wherein each scheme comprises an algorithm and a complementary algorithm;
identifying, from the obtained performance data, a scheme having an algorithm that fulfils performance criteria for the first device;

identifying, from the obtained performance data, a complementary algorithm that fulfils performance criteria for the second device; and
setting the identified scheme as the first scheme.

2. The method according to claim 1, further comprising:
identifying, by the first device, from the obtained performance data another scheme having a complementary algorithm that fulfils performance criteria for the first device; and
setting the identified scheme as the second scheme.

3. The method according to claim 1, further comprising:
identifying, from the obtained performance data, another scheme having an algorithm that fulfils performance criteria for the second device;
identifying, from the obtained performance data, a complementary algorithm that fulfils performance criteria for the first device; and
setting the identified another scheme as the second scheme.

4. The method according to claim 1, wherein:
the first scheme comprises a first encryption scheme, whereby the first algorithm associated with the first scheme comprises an encryption primitive, and the first complementary algorithm associated with the first scheme comprises a decryption primitive; and
the second scheme comprises a second encryption scheme, whereby the second algorithm associated with the second scheme comprises an encryption primitive, and the second complementary algorithm associated with the second scheme comprises a decryption primitive.

5. The method according to claim 1, wherein:
the first scheme comprises a first digital signature scheme, whereby the first algorithm associated with the first scheme comprises a signing function, and the first processing algorithm associated with the first scheme comprises a verification function; and
the second scheme comprises a second digital signature scheme, whereby the second algorithm associated with the second scheme comprises a signing function, and the second complementary algorithm associated with the second scheme comprises a verification function.

6. The method according to claim 1, wherein:
the first scheme comprises a first encryption scheme, whereby the first algorithm associated with the first scheme comprises an encryption primitive, and the first complementary algorithm associated with the first scheme comprises a decryption primitive; and
the second scheme comprises a second digital signature scheme, whereby the second algorithm associated with the second scheme comprises a signing function, and the second complementary algorithm associated with the second scheme comprises a verification function.

7. A first device for communicating efficiently and securely with a second device, the first device comprising:
a processor; and
a non-transitory media readable by the processor, the media storing instructions that when executed by the processor, cause the processor to:
generate a first message using a first algorithm associated with a first scheme;
transmit the first message to the second device, such that the second device applies a first complementary algorithm associated with the first scheme to the received first message;
receive a second message from the second device, wherein the second message is generated by the second device applying a second algorithm associated with a second scheme; and
applying, to the second message, a second complementary algorithm associated with the second scheme to the received second message,
wherein the first algorithm and the second complementary algorithm fulfil performance criteria for the first device, and whereby the first scheme is different from the second scheme, and
wherein before generating the first message using the first algorithm associated with the first scheme, the instructions cause the processor to:
obtain performance data for a plurality of types of schemes, wherein each scheme comprises an algorithm and a complementary algorithm; and
identify from the obtained performance data a scheme having an algorithm that fulfils performance criteria for the first device and setting the identified scheme as the first scheme;
wherein before generating the first message using the first algorithm associated with the first scheme, the instructions cause the processor to:
obtain performance data for a plurality of types of schemes, wherein each scheme comprises an algorithm and a complementary algorithm;
identify from the obtained performance data a scheme having an algorithm that fulfils performance criteria for the first device;
identify a complementary algorithm that fulfils performance criteria for the second device; and
set the identified scheme as the first scheme.

8. The first device according to claim 7, further comprising:
instructions that cause the processor to:
identify from the obtained performance data another scheme having a complementary algorithm that fulfils performance criteria for the first device; and
set the identified scheme as the second scheme.

9. The first device according to claim 7, wherein before generating the first message using the first algorithm associated with the first scheme, the instructions cause the processor to:
identify from the obtained performance data another scheme having an algorithm that fulfils performance criteria for the second device;
identify a complementary algorithm that fulfils performance criteria for the first device; and
set the identified another scheme as the second scheme.

10. The first device according to claim 7, wherein:
the first scheme comprises a first encryption scheme, whereby the first algorithm associated with the first scheme comprises an encryption primitive, and the first complementary algorithm associated with the first scheme comprises a decryption primitive; and
the second scheme comprises a second encryption scheme, whereby the second algorithm associated with the second scheme comprises an encryption primitive, and the second complementary algorithm associated with the second scheme comprises a decryption primitive.

11. The first device according to claim 7, wherein:
the first scheme comprises a first digital signature scheme, whereby the first algorithm associated with the first scheme comprises a signing function, and the first processing algorithm associated with the first scheme comprises a verification function; and the second scheme comprises a second digital signature scheme, whereby the second algorithm associated with the second scheme comprises a signing function, and the second complementary algorithm associated with the second scheme comprises a verification function.

12. The first device according to claim 7, wherein:

the first scheme comprises a first encryption scheme, whereby the first algorithm associated with the first scheme comprises an encryption primitive, and the first complementary algorithm associated with the first scheme comprises a decryption primitive; and the second scheme comprises a second digital signature scheme, whereby the second algorithm associated with the second scheme comprises a signing function, and the second complementary algorithm associated with the second scheme comprises a verification function.

13. The first device according to claim 7, wherein:

the first scheme comprises a first digital signature scheme, whereby the first algorithm associated with the first scheme comprises a signing function, and the first complementary algorithm associated with the first scheme comprises a verification function; and the second scheme comprises a second encryption scheme, whereby the second algorithm associated with the second scheme comprises an encryption primitive, and the second complementary algorithm associated with the second scheme comprises a decryption primitive.

14. The first device according to claim 7, wherein the first message comprises cipher-text and the first message, and after applying the first complementary algorithm, comprises plaintext.

15. A method for a first device to communicate efficiently and securely with a second device, comprising:

receiving, by the second device, a first message generated by the first device using a first algorithm associated with a first scheme;

applying, by the second device, a first complementary algorithm associated with the first scheme to the first message; and transmitting, by the second device and to the first device, a second message generated using a second algorithm associated with a second scheme, such that the first device applies a second complementary algorithm associated with the second scheme to the second message, wherein the first algorithm and the second complementary algorithm fulfil performance criteria for the first device, and whereby the first scheme is different from the second scheme, and wherein before receiving the first message generated by the first device using the first algorithm associated with the first scheme, the method comprises:

obtaining, by the second device, performance data for a plurality of types of schemes, wherein each scheme comprises an algorithm and a complementary algorithm;

identifying, by the second device, from the obtained performance data a scheme having an algorithm that fulfils performance criteria for the first device;

identifying a complementary algorithm that fulfils performance criteria for the second device; and setting the identified scheme as the first scheme.

16. The method according to claim 15, further comprising:

identifying, by the second device, from the obtained performance data another scheme having a complementary algorithm that fulfils performance criteria for the first device; and setting the identified scheme as the second scheme.

17. The method according to claim 15, further comprising:

identifying from the obtained performance data another scheme having an algorithm that fulfils performance criteria for the second device;

identifying a complementary algorithm that fulfils performance criteria for the first device; and setting the identified another scheme as the second scheme.

18. The method according to claim 15, wherein:

the first scheme comprises a first encryption scheme, whereby the first algorithm associated with the first scheme comprises an encryption primitive, and the first complementary algorithm associated with the first scheme comprises a decryption primitive; and the second scheme comprises a second encryption scheme, whereby the second algorithm associated with the second scheme comprises an encryption primitive, and the second complementary algorithm associated with the second scheme comprises a decryption primitive.

19. The method according to claim 15, wherein:

the first scheme comprises a first digital signature scheme, whereby the first algorithm associated with the first scheme comprises a signing function, and the first processing algorithm associated with the first scheme comprises a verification function; and the second scheme comprises a second digital signature scheme, whereby the second algorithm associated with the second scheme comprises a signing function, and the second complementary algorithm associated with the second scheme comprises a verification function.

20. A second device for communicating efficiently and securely with a first device, the second device comprising:

a processor; and a non-transitory media readable by the processor, the media storing instructions that when executed by the processor, cause the processor to:

receive a first message generated by the first device by using a first algorithm associated with a first scheme;

apply a first complementary algorithm associated with the first scheme to the first message; and transmit, to the first device, a second message generated using a second algorithm associated with a second scheme, such that the first device applies a second complementary algorithm associated with the second scheme to the second message, wherein the first algorithm and the second complementary algorithm fulfil performance criteria for the first device, and whereby the first scheme is different from the second scheme, and wherein before receiving the first message generated by the first device using the first algorithm associated with the first scheme, the instructions cause the processor to:

obtain performance data for a plurality of types of schemes, wherein each scheme comprises an algorithm and a complementary algorithm;

identify from the obtained performance data a scheme having an algorithm that fulfils performance criteria for the first device;

identify a complementary algorithm that fulfils performance criteria for the second device; and
set the identified scheme as the first scheme.

21. The second device according to claim 20, wherein the instructions further cause the processor to:
identify from the obtained performance data another scheme having a complementary algorithm that fulfils performance criteria for the first device; and
set the identified scheme as the second scheme.

22. The second device according to claim 20, wherein the instructions further cause the processor to:
identify from the obtained performance data another scheme having an algorithm that fulfils performance criteria for the second device;
identify a complementary algorithm that fulfils performance criteria for the first device; and
set the identified another scheme as the second scheme.

* * * * *

UNITED STATES PATENT AND TRADEMARK OFFICE
CERTIFICATE OF CORRECTION

| | |
|---|---|
| PATENT NO. | : 11,228,589 B2 |
| APPLICATION NO. | : 16/529470 |
| DATED | : January 18, 2022 |
| INVENTOR(S) | : Naccache et al. |

It is certified that error appears in the above-identified patent and that said Letters Patent is hereby corrected as shown below:

In the Claims

Claim 7: Column 22, Line 22: "first scheme;" should read -- first scheme, --.

Signed and Sealed this
Twenty-fourth Day of May, 2022

Katherine Kelly Vidal
*Director of the United States Patent and Trademark Office*